United States Patent
Berson

(10) Patent No.: US 7,184,557 B2
(45) Date of Patent: Feb. 27, 2007

(54) METHODS AND APPARATUSES FOR RECORDING AND PLAYING BACK AUDIO SIGNALS

(76) Inventor: William Berson, 9 Huckleberry La., Weston, CT (US) 06883

( * ) Notice: Subject to any disclaimer, the term of this patent is extended or adjusted under 35 U.S.C. 154(b) by 0 days.

(21) Appl. No.: 11/219,514

(22) Filed: Sep. 2, 2005

(65) Prior Publication Data

US 2006/0198531 A1    Sep. 7, 2006

Related U.S. Application Data

(60) Provisional application No. 60/658,635, filed on Mar. 3, 2005.

(51) Int. Cl.
*H03G 3/00* (2006.01)
(52) U.S. Cl. .............. 381/61; 381/310; 381/17
(58) Field of Classification Search .......... 381/61, 381/17, 310; 700/94
See application file for complete search history.

(56) References Cited

U.S. PATENT DOCUMENTS

| | | | |
|---|---|---|---|
| 3,535,453 A | 10/1970 | Veneklasen | |
| 4,332,979 A | 6/1982 | Fischer | |
| 4,338,581 A | 7/1982 | Morgan | |
| 4,349,697 A | 9/1982 | Skabla | |
| 4,356,349 A | 10/1982 | Robinson | |
| 4,535,474 A | 8/1985 | Borish et al. | |
| 4,731,848 A | 3/1988 | Kendall et al. | |
| 5,027,687 A * | 7/1991 | Iwamatsu | 84/600 |
| 5,146,507 A | 9/1992 | Satoh et al. | |
| 5,467,401 A | 11/1995 | Nagamitsu et al. | |
| 5,487,113 A | 1/1996 | Mark et al. | |
| 5,524,053 A | 6/1996 | Iwamatsu | |
| 5,525,765 A | 6/1996 | Freiheit | |
| 5,544,249 A | 8/1996 | Opitz | |
| 5,652,798 A | 7/1997 | Mizushima | |

(Continued)

FOREIGN PATENT DOCUMENTS

EP    0567316 A2    10/1993

(Continued)

OTHER PUBLICATIONS

Barron et al., "Spatial Impression Due to Early Lateral Reflections in Concert Halls: The Derivation of a Physical Measure," J. Sound and Vibration, vol. 77, No. 2, Jul. 22, 1981, pp. 211-232.

(Continued)

*Primary Examiner*—Vivian Chin
*Assistant Examiner*—Jason Kurr
(74) *Attorney, Agent, or Firm*—Fish & Neave IP Group of Ropes & Gray LLP

(57) ABSTRACT

Methods and apparatus for recreating audio signals to sound as though the signals had been recorded in a different acoustic environment is provided. The methods and apparatus may include one or more inputs that receive an audio signal and an input that receives a selected acoustic environment signal, as well as processing circuitry that produces one or more output signals representative of the audio signal being played in the selected acoustic environment. The input, output and characterization signals may be processed and recorded to storage media, either individually or together. The circuitry may interface with other technology and circuitry or may be a complete stand-alone system.

38 Claims, 5 Drawing Sheets

U.S. PATENT DOCUMENTS

| | | | |
|---|---|---|---|
| 5,734,795 A | 3/1998 | Rogers | |
| 5,764,777 A | 6/1998 | Goldfarb | |
| 5,774,560 A | 6/1998 | Su et al. | |
| 5,812,674 A | 9/1998 | Jot et al. | |
| 5,812,675 A | 9/1998 | Taylor | |
| 5,835,093 A | 11/1998 | Fujishita et al. | |
| 5,943,427 A | 8/1999 | Massie et al. | |
| 5,982,902 A | 11/1999 | Terano | |
| 5,990,405 A | 11/1999 | Auten et al. | |
| 6,118,875 A * | 9/2000 | Moller et al. | 381/1 |
| 6,157,724 A | 12/2000 | Kawakami | |
| 6,188,769 B1 | 2/2001 | Jot et al. | |
| 6,222,930 B1 | 4/2001 | Nakano et al. | |
| 6,239,348 B1 | 5/2001 | Metcalf | |
| 6,336,219 B1 * | 1/2002 | Nathan | 725/91 |
| 6,343,131 B1 | 1/2002 | Huopaniemi | |
| 6,362,411 B1 | 3/2002 | Suzuki et al. | |
| 6,385,320 B1 | 5/2002 | Lee | |
| 6,418,226 B2 | 7/2002 | Mukojima | |
| 6,444,892 B1 | 9/2002 | Metcalf | |
| 6,665,409 B1 | 12/2003 | Rao | |
| 6,728,664 B1 | 4/2004 | Fouad | |
| 6,760,447 B1 | 7/2004 | Nelson et al. | |
| 6,816,846 B1 | 11/2004 | Back et al. | |
| 2001/0021257 A1 | 9/2001 | Ishii | |
| 2002/0002039 A1 * | 1/2002 | Qureshey et al. | 455/344 |
| 2003/0007648 A1 | 1/2003 | Currell | |
| 2003/0028273 A1 | 2/2003 | Lydecker et al. | |
| 2003/0029306 A1 | 2/2003 | Metcalf | |
| 2003/0053633 A1 | 3/2003 | Sotome et al. | |
| 2003/0086572 A1 | 5/2003 | Sotome et al. | |
| 2003/0152237 A1 | 8/2003 | Nielsen et al. | |
| 2003/0215097 A1 * | 11/2003 | Crutchfield, Jr. | 381/61 |
| 2004/0136538 A1 | 7/2004 | Cohen et al. | |
| 2004/0205204 A1 | 10/2004 | Chafe | |
| 2004/0218771 A1 | 11/2004 | Chalupper et al. | |
| 2004/0235545 A1 | 11/2004 | Landis | |
| 2004/0264704 A1 * | 12/2004 | Huin et al. | 381/59 |
| 2005/0220309 A1 * | 10/2005 | Hirata et al. | 381/18 |

FOREIGN PATENT DOCUMENTS

| | | |
|---|---|---|
| EP | 0356995 | 11/1994 |
| EP | 0593228 | 1/2000 |
| EP | 1023716 | 8/2000 |
| EP | 1176594 A1 | 1/2002 |
| EP | 1416769 | 5/2004 |
| GB | 2305092 | 3/1997 |
| JP | 63316390 | 12/1988 |
| WO | WO 98/01197 | 1/1998 |
| WO | WO 98/20709 | 5/1998 |
| WO | WO 01/26220 | 4/2001 |
| WO | WO 02/035700 | 5/2002 |
| WO | WO 03/104924 | 12/2003 |
| WO | WO 2004/032351 | 4/2004 |
| WO | WO 2004/077884 | 9/2004 |

OTHER PUBLICATIONS

Bencina, "AudioMulch Interactive Music," printed on Aug. 5, 2005, http://www.audiomulch.com.

Borish et al., "An Efficient Algorithm for Measuring the Impulse Response Using Pseudorandom Noise," J. Audio Eng. Soc., vol. 31, No. 7, Jul./Aug. 1983.

Chapin et al., "Virtual Environment Display for a 3-D Audio Room Simulation," Telepresence Research, Portola Valley, CA, USA, Conference: SPIE Stereoscopic Displays and Applications III, vol. 1669, pp. 256-267 (1992).

Edelbrock, "Room Acoustics Modeling," 1996, http://www.ramsete.com/Aurora/saw/roomsim.html.

Funkhouser et al., "A Beam Tracing Method for Interactive Architectural Acoustics," Princeton University and Bell Laboratories, PACS Nos. 43.55.Ka, 43.58.Ta, pp. 1-69.

Grant, "Theatres and Acoustics Afloat, White Paper/Article for Captains Log," Captains' Magazine, Sep. 2002.

Griesinger, "Beyond MLS Occupied Hall Measurement with FFT Techniques," Lexicon, www.lares-lexicon.com, printed Aug. 9, 2005.

Griesinger, "Improving Room Acoustics Through Time-Variant Synthetic Reverberation," Lexicon, Nov. 5, 1990.

Griesinger, "Objective Measures of Spaciousness and Envelopment," Audio Engineering Society 16th International Conference on Spatial Sound Reproduction, Lexicon, www.lares-lexicon.com.

Griesinger, "Recent Experiences with Electronic Acoustic Enhancement in Concert Halls and Opera Houses," Lexicon, www.lares-lexicon. com.

Griesinger, "The Psychoacoustics of Apparent Source Width, Spaciousness and Envelopment in Performance Spaces," Lexicon, Acta Acoustica, vol. 83, Jan. 29, 1997.

Guidorzi et al., "Sample Champion- Application note #11 Room Acoustics Acoustical Parameters Measurement," www.purebits.com.

Kiuchi et al., "The Digital Signal Processor LSI for Car Acoustic Environment Reproduction," Dearborn, MI, USA, published by IEEE Service Center, Cat. No. 88TH0231, pp. 6-12, 1988.

Lokki, "Implementation of Virtual Acoustics for a Computational Concert Hall Model," Abstract of the Master's Thesis, Helsinki University of Technology, Dec. 15, 1997.

Loomis et al., Active Localization of Virtual Sounds, J. Acoustic Soc. Am., vol. 88, No. 4, Oct. 1990, pp. 1757-1764.

Nempee, "Acoustic Software," Architectural Acoustic Software, Nampee printed on Aug. 15, 2005, www.nampee.com/acousoft.htm.

Peiyu et al., "Real-Time Experimental Research on the Similarity of Room Acoustic Paths for Audio Blind Signal Separation," IEEE, Cat. No. 02EX591, vol. 2, 29, pp. 890-893, Jun.-Jul. 1, 2002.

Schroeder, New Method of Measuring Reverberation Time, J. Acoust. Soc. Am., 1965.

Schultz, "Acoustics of the Concert Hall," IEEE Spectrum, pp. 56-67, Jun. 1965.

Vorlander et al., Practical Aspects of MLS Measurements in Building Acoustics, Applied Acoustics, vol. 52, No. 3/4, pp. 239-258 (1997).

"90th Convention of the Audio Engineering Society," papers from the Conference: 90th Convention of the Audio Engineering Society, Paris, France, 19910219 Audio Engineering Society Preprint 1991, published by Audio Engineering Soc., New York, NY, USA, 1991.

* cited by examiner

METHODS AND APPARATUSES FOR RECORDING AND PLAYING BACK AUDIO SIGNALS

BACKGROUND OF THE INVENTION

This invention relates to multi-media recording, processing and playback of audio signals. More particularly, this invention relates to reproducing stored audio signals in a manner such that the reproduced signals sound as if the stored audio signals had been recorded in a particular acoustic environment.

An acoustic environment is the culmination of anything that may affect the production, propagation or reverberation of an audio signal. More particularly, the acoustic environment is how sound waves interact with the surroundings.

Audio signal recording, processing and playback techniques have traditionally been utilized to capture and playback sound. Audio signal recording techniques involve creating both representative and storage signals, which may be of different domains (e.g., mechanical, optical, electrical, etc.) than the original analog sound signals. For example, the audio signals may be converted into representative signals of electrical pulses, which may then be converted into storage signals such as the physical grooves in a vinyl record or the optical grooves in a compact disc (CD). The translation from the audio domain to a storage domain usually requires that the audio signals are processed by various audio, mechanical and/or electrical equipment (e.g., such as a microphone, audio mixer, digitizer, CD burner, etc.).

In some instances, a microphone or other transducer may be used to convert the audio signals into representative signals. The representative signals may be further processed by a sound mixer and/or stored by a CD burner to a CD. The stored signals may be further processed and/or played back from the stored form.

Audio, representative and storage signals are often processed by various types of equipment. The processing of the signals may result in improvements in the fidelity and accuracy of the sound compared to how the audio signals originally sounded. Current sound processing techniques, however, do not permit an audio signal recorded in one acoustic environment to be played back to sound as if it was originally recorded in one or more user-selectable other acoustic environments.

High quality sound stereo systems enable a user to experience the finest quality of sound from the comfort of their home. However, even the most advanced or expensive sound systems do not currently allow users to experience audio performances that sound, for example, "live," unless the original recording was a "live" recording (versus a studio recording). This is because even the most advanced and expensive systems are limited to playing back the audio signals that were recorded with minor, uncoordinated modifications (such as adjusting bass or treble).

For example, a person might have a recording of the songs from The Phantom of the Opera on CD or own a copy of The Phantom of the Opera on DVD (theatrically released in December of 2004). The audio of the CD or DVD will likely not sound the same in a user's home as the songs sounded when they are performed live in the Majestic Theater in New York City. One of the reasons for this is because sounds on CDs and DVDs are generally recorded in a recording studio (or other acoustically controlled environment). Each time a listener wants to hear how The Phantom of the Opera sounds live, the listener must purchase a ticket and attend a performance, regardless of their current home entertainment system (unless a "live" recording was made in the Majestic Theater).

Some home entertainment systems may provide a user with a more advanced ability to alter the audio signals, such as surround sound or through an equalizer, but even this added capability does not permit a user to hear the sound as it would have been influenced by the acoustic environment during a "live" performance.

Moreover, even "live" performances may not necessarily sound "live" when played back from a CD or DVD. This is because even when audio signals are recorded live (i.e., not in a recording studio) the signals are generally captured at the source of audio signals (e.g., near a speaker placed directly in front of the performer), which may prevent the audio signals from being affected by the acoustic environment of the venue.

In addition, even when the audio signals are allowed to be influenced by the acoustics of a venue, the audio signals recorded are still limited to the acoustic environment of the location of the sound capturing device (e.g., microphone). For example, a live recording of the Broadway Musical The Phantom of the Opera in the Majestic Theater may differ depending where the recording transducer is located. When the recording apparatus is located in the balcony, the recorded audio signals will likely be influenced by a different acoustic environment than if the recording apparatus is located center stage. The prior art simply does not account for these differences in acoustic environments.

Another deficiency with known recordings of audio signals is the requirement that the origin of the audio signal or signals has to be present in the acoustic environment with the sound capturing device to capture how that acoustic environment influences the sound. For example, if the late Johnny Cash never performed in the Majestic Theater, then it would be impossible to hear a Johnny Cash recording played back as it would have sounded "live" at the Majestic Theater.

Along those same lines, if somebody always wanted to hear what they would sound like singing the National Anthem at Yankee Stadium, they would have had to have a recording made of them actually singing at Yankee Stadium. The user is unable to select different audio signals to be altered by user selected acoustic environments. These limitations currently exist regardless of the complexity or superiority of a user's home entertainment system (e.g., surround sound, Dolby digital, quadraphonic, and virtual sound imaging systems, to list a few).

In view of the foregoing, it is an object of this invention to provide methods, systems and computer readable media to record, process and playback recreated acoustic signals as though the signals were influenced by one or more acoustic environments.

SUMMARY OF THE INVENTION

These and other objects of the present invention are accomplished in accordance with the principles of the present invention by providing circuitry that utilizes at least two inputs to produce at least one output. In some embodiments of this invention, an audio signal input and a selected acoustic environment characterization input may be processed together to produce a modified audio output signal that essentially sounds as if it were recorded and/or played back in the acoustic environment represented by the selected acoustic characterization even though such a recording is not readily available.

In other embodiments of the present invention, the audio signal input may be one or more audio signals emitted from an audio source or any other signal(s) representing such audio signals (e.g., digital signals stored on a hard drive in MP3 format). The acoustic environment input may be signals that represent the acoustics or acoustical characteristics of a particular acoustic environment (e.g., an actual concert hall, stadium, bar, etc.).

In still more embodiments, the present invention may model one or more acoustic environments. The model of the acoustic environment may be used as the acoustic environment input of the present invention.

The output signal may, in some embodiments of this invention, be one or more audio signals or other type of signals, which are substantially the same as the signal produced when the audio signal of the first input is acoustically influenced by the acoustic environment of the second input. Any input and/or output signal or signals may be recorded or saved on storage media.

The input signals may, in other embodiments of the present invention, be provided by a storage medium, downloaded from a remote location (e.g., via the Internet), and/or provided from a sensor or other apparatus as streaming media. One or more of the input signals may be processed and/or played back by the present invention.

It may be desirable, in some embodiments of the present invention, for the output to be a reproduction of audio signals that sound as if the audio signals have been influenced by an acoustic environment.

In other embodiments of this invention, the output of the invention may be enhanced to provide an acoustical presence. For example, surround sound systems or other presently available technology may be utilized in connection with the present invention to provide a more realistic reproduction of the effects that an acoustic environment may have on an audio signal. In this manner, the present invention may improve upon existing recording, processing and projection of audio signals.

The present invention may reduce the cost of recording live performances. For example, in some embodiment, a performer would no longer need to perform in a venue for their performance to be influenced by the venue's acoustical environment. In this manner, a live performance may be recreated without the actual performer ever performing in a particular venue.

In still other embodiments of the present invention, the performance characteristics of an acoustic environment may be independently productized and distributed over the internet, in retail stores or by other means.

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which.

DETAILED DESCRIPTION OF THE INVENTION

Figure 1:
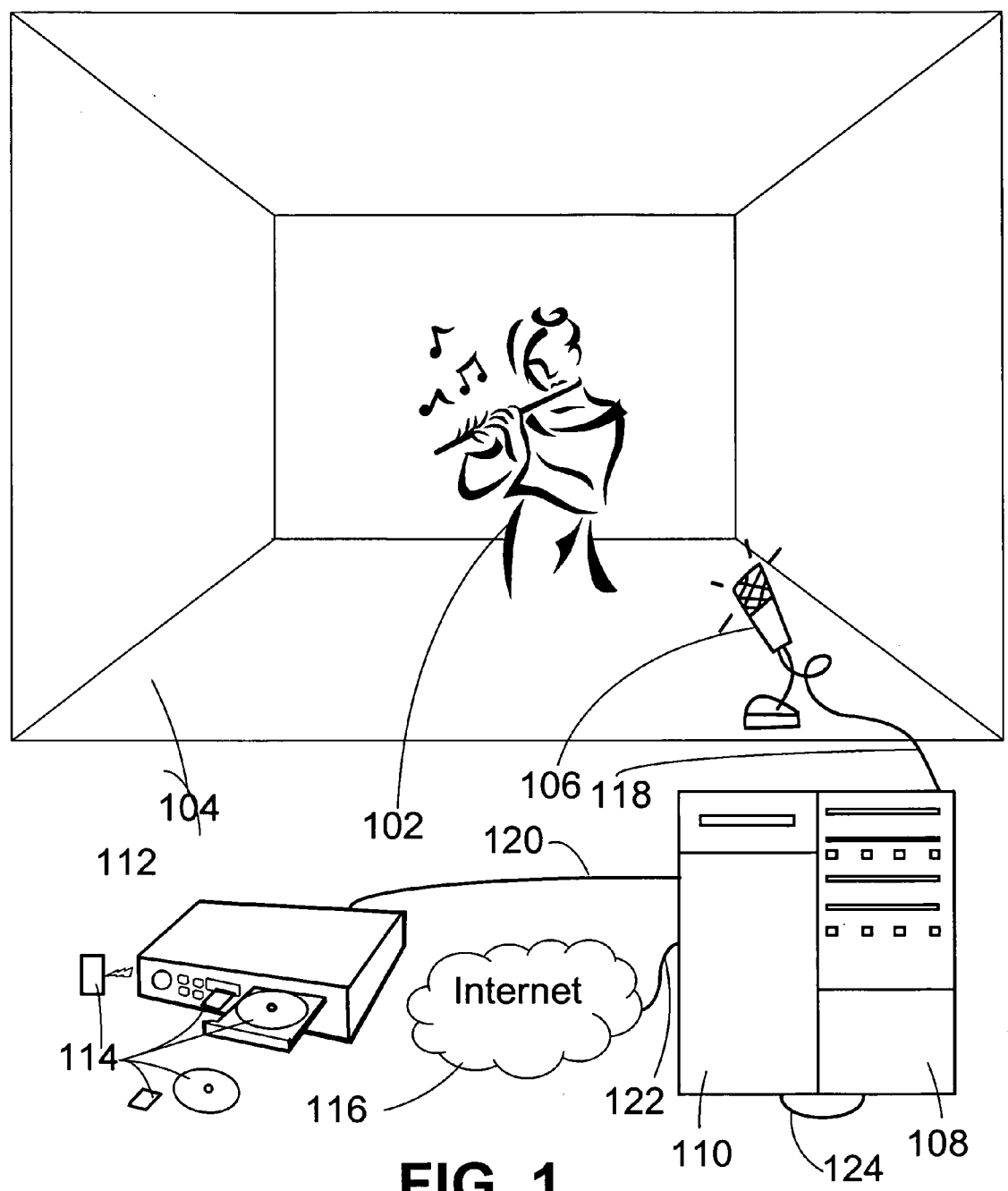
FIG. 1 is an illustration of one embodiment of a system of recording audio signals in accordance with the principles of the present invention in which the audio signals are recorded, processed and stored.

FIG. 1 shows system 100 that includes circuitry that may be used in accordance with the principles of the present invention to create altered audio recordings. System 100, which is particularly directed at acquiring the audio signals to be altered, includes audio source 102 that emits audio signals in acoustic environment 104.

Audio source 102, which includes at least one sound emitting body, or object, may also include a collection of sound emitting bodies, instruments, objects and/or devices. For example, audio source 102 may be one or more people producing sound (e.g., singing, talking, stomping their feet, clapping their hands, crying, breathing, etc.), musical instruments, alarms, firearms, audio speakers, electronic devices and/or animals (e.g., dog, dolphin, cat, etc.).

Audio source 102 may also be a quiet object that does not usually generate sound (e.g., a door, water, rocks), unless one or more forces are applied to the object (e.g., slamming a door, the ocean crashing on rocks, etc.). For example, a normally quiet tree may make a "creaking" sound when a gentle breeze is present. Fingernails and a chalkboard are examples of objects incapable of emitting sound on their own, yet when fingernails are dragged across a chalkboard a very distinct noise may be emitted.

Acoustic environment 104 is any actual place that audio signals may be present and/or influenced. Thus, acoustic environment 104 may be any location in a venue in which performances occur, such as a concert hall, sports stadium, recording studio, etc. Acoustic environment 104 may be more specific, such as a particular seat in a particular venue. Acoustic environment 104 may also be, for example, any room of any structure (e.g., any room in any home, the oval office, the kitchen in a submarine, etc.), a shower (with or without water coming out of the shower head), a local bar or restaurant, etc., or any place in nature (e.g., the beach, the Grand Canyon, the Redwood forest, etc.).

In general, audio signals emitted by audio source 102 are influenced by the acoustic properties of environment 104. This includes the geometry, materials, temperature, spacing and orientation of environment 104. For example, recorded audio signals produced by source 102 will be effected differently when the walls of acoustic environment 104 are made out of steel versus rubber, even if all other factors are the same. For many audio recordings (e.g., commercially produced musical CDs, movie sound effects, etc.), acoustic environment 104 is often a recording studio designed to minimize the affect of the environment on the sounds emitted by audio source 102.

Capturing device 106 captures audio signals emitted by audio source 102 as influenced (or not) by acoustic environment 104. Capturing device 106 may include one or more microphones or other transducers that may convert analog audio signals into representative signals of a different domain (e.g., electrical, magnetic, optical, mechanical, etc.). These representative signals are then processed by processor 108, digitized by digitizer 110, stored on storage media by recording device 112, uploaded to Internet 116, and/or they may be recorded in analog form on magnetic tape (not shown) for later use.

Processor 108, if used, processes the representative signals by, for example, amplifying, filtering, mixing, modifying or otherwise controlling the signals that represent the captured audio signals. Processor 108 may be similar to audio equipment found in the most sophisticated professional recording studios or it may be simple as a basic amplifier. Alternatively, in some embodiments, processor 108 may not be included in system 100.

In some embodiments of the present invention, system 100 also includes digitizer 110 to convert the representative signals captured by capturing device 106 into digital signals (i.e., a series of ones and zeros). The digital signals created by digitizer 110 would then be provided to processor 108 for processing (i.e., additional processing or initial processing depending on whether the signal was processed prior to being digitized).

Ultimately, the audio signals produced by audio source 102 are stored by recording device 112 on storage media as recording 114. This may occur after the signals have been processed and/or digitized, or they may be recorded directly in analog form. For example, recording 114 may be stored on a CD, DVD, memory card, memory stick, USB storage device, magnetic tape, Read Only Memory (ROM), Random Access Memory (RAM), palm pilot, cellular phone, mini disk or any other media that may be used to store audio signals or representative signals. Recording device 112 can support multiple types of storage media as shown in FIG. 1 and may be able to transmit information wirelessly (e.g., infrared or otherwise) to storage media when creating recording 114.

Capturing device 106, processor 108, digitizer 110, recorder 112 and internet 118 may exchange data and communicate with each other over communications paths such as communications paths 118, 120, 122 and 124. Paths 118, 120, 122 and 124 may be cables or other wired connections, free-space connections (e.g., wireless signals), satellite links, or any other suitable link or combination of links.

Figure 2:
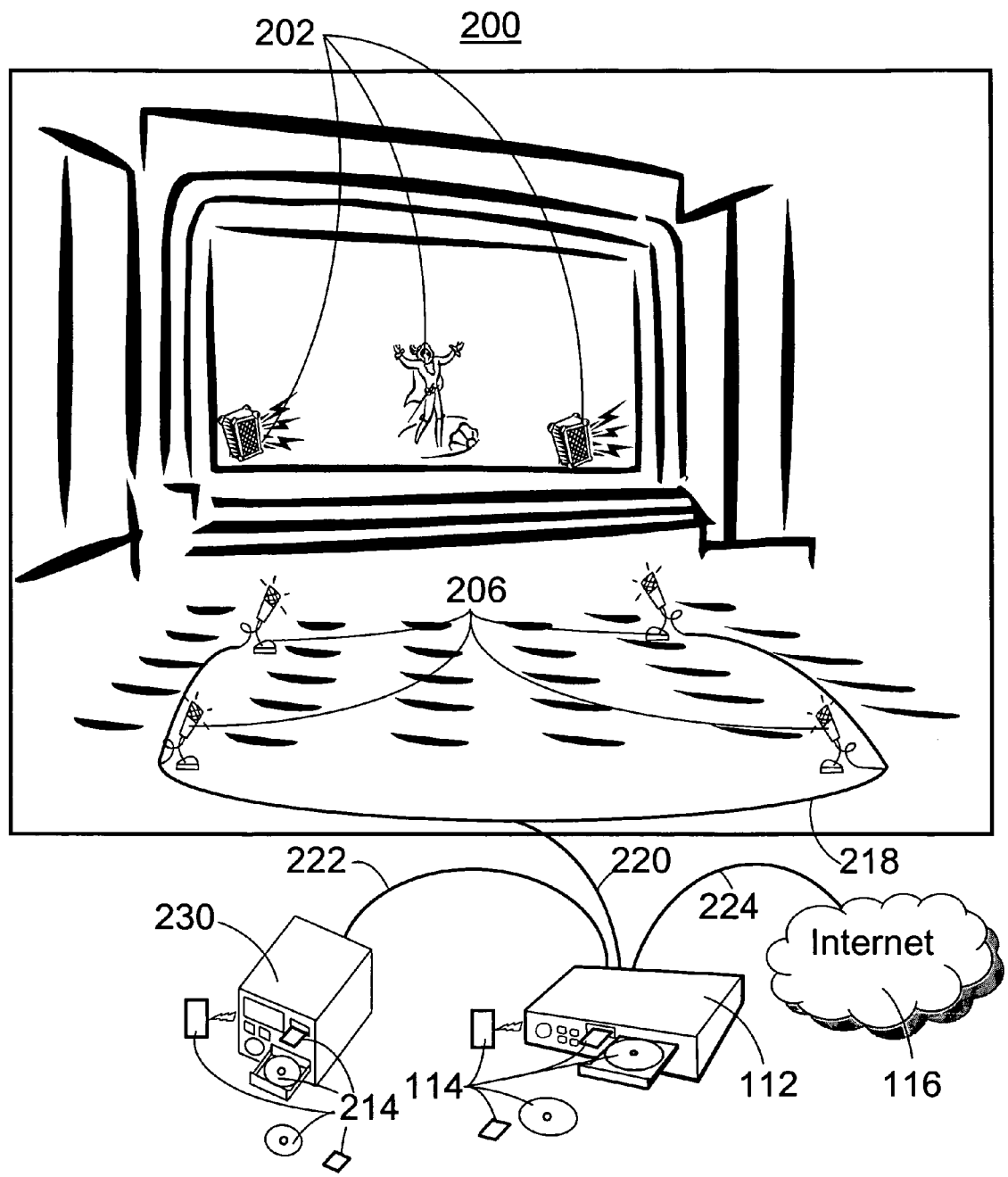
FIG. 2 is an illustration of one embodiment of a system for characterizing an acoustic environment in accordance with the principles of the present invention in which at least one signal representing the characteristics of the acoustic environment may be recorded, analyzed, stored on media and/or provided to the internet.

FIG. 2 shows system 200 that includes circuitry that also may be used in accordance with the principles of the present invention to create altered audio recordings. In particular, system 200 is used to create characterization 214 of acoustic environment 204. System 200 includes: excitation device 202 (which may be substantially similar to audio source 102 described above), capturing device(s) 206, recording device 112 (which may be omitted) and analysis system 230.

Acoustic environment 204 refers to any acoustic environment where audio signals may be present or introduced. Acoustic environment 204 may be characterized or defined by one or more sets of equations, algorithms, formulae, data and relationships containing information. For example, reverberation, absorption, reflection, amplification, frequency shift, noise, as well as other parameters as a function of the source, location, atmospheric conditions, listener's location, etc. may be used to create characterization 214. Acoustic environment 204 can be anyplace where sound occurs, including but not limited to all of the environments discussed above with respect to environment 104.

In some embodiments of system 200, a plurality of capturing devices 206 (e.g., microphones) are strategically positioned in environment 204 to increase the resolution of characterization 214. For example, microphones having desired sensitivity and pickup pattern may be placed at various audience locations in acoustic environment 204 to obtain a representative survey of acoustic environment 204 at common listening locations (e.g., front row center, orchestra center, front row balcony left, etc.).

The signals emitted by excitation device 202 are influenced by acoustic environment 204 in the same manner as described above with respect to system 100 of FIG. 1. The emitted signals are captured by device 206 which may convert them into representative signals of a different domain, if desired. The captured signals are then provided to recorder 112, Internet 116 and/or analysis system 230 and/or any other system or device.

Analysis system 230 receives signals via communication path 222, which may be from recording device 112 or Internet 116. Analysis system 230 utilizes any combination of these inputs to determine how acoustic environment 204 influences the signals emitted from excitation device 202. For example, analysis system 230 may compare data (e.g., pitch, frequency, timing, amplitude and other characteristics) related to the signals emitted by excitation device 202 to the data received by each of the capturing devices 206. In this manner, analysis system generates characterization 214 as a representation of how acoustic environment 204 influences sound, and records or stores characterization 214 in the same manner as described above with respect to the storage media used to store recording 114.

In some embodiments of the present invention, the sounds emitted by excitation device 202 could be at least one test audio signal. A test audio signal is a sample of music or other type of signal that enhances how acoustic environment 204 influences a particular type of sound. A test audio signal may be, for example, music recorded on a CD or signals developed for the purpose of being a test audio signal. For example, a test audio signal may be a rock and roll song that tests how acoustic environment 204 influences rock and roll music (i.e., the combination of electric guitar sounds with drum sounds and other popular rock and roll sounds). As another example, the test audio signal or signals may be one or more samples of classical music (e.g., the combination of piano sounds, violin sounds, etc.), country music (e.g., banjo sounds, guitar sounds, harmonica sounds, etc.), jazz music, blues music and/or any other combination of musical tones.

As described above, analysis system 230 processes the resultant singles (i.e., the test audio signals and the test audio signals as influenced by acoustic environment 204) together to find the similarities between all the signals. Analysis system 230 may then extract those commonalities and use them to generate characterization 214, which may be directed towards characterizing an acoustic environment for a particular type of music.

In some embodiments of the present invention, analysis system 200 may be used to create one or more libraries of characterizations (not shown). A library of characterizations can include one or more characterizations, such as characterization 214, that are grouped with one or more other characterizations. The library of characterizations may be stored on storage media or be electronically transferred (e.g., via the Internet), such that similar characterizations to be organized together. For example, a library of characterizations may include a plurality of characterizations for different locations of the Majestic Theater (e.g., characterizations for the front row center, orchestra center, front row balcony left, etc.), or it may include a plurality of characterizations for how different types of music are affected by the Majestic Theater (e.g., Opera, Rock, Jazz, Hip-Hop, etc.). Alternatively, a library of characterizations may also be a random assortment of unrelated characterizations, such as different venues, or may be characterizations grouped together by a user or other system.

Libraries of characterizations may be licensed and/or sold through conventional sales channels (such as by selling a library stored on CD-ROM in an electronics store, as computer software is often distributed), or they may be downloaded from the Internet, etc. Under these circumstances, some or all of the characterizations associated with the library may be available as a single product.

Alternatively, each characterization of the library may also be available as an individual product. In this manner, an entire library may be distributed together, but rights to use particular characterizations of the library can be purchased on an individual basis. For example, a library of characterizations including characterizations of how the Majestic Theater influences different types of music may be distributed as a single product, but users would be limited to accessing only the characterizations they purchased, such as those associated with Opera music. In that case, the remaining characterizations in the library would be locked to prevent unauthorized use.

In alternative embodiments of the present invention, characterization 214 may also be created by system 200 using analytical or theoretical characterizations. In this manner, analysis system 230 is used to create characterization 214 without the use of excitation device 202, capturing device 206, Internet 116 and/or recorder 112. In that circumstance, analysis device 230 receives specifications of acoustic environment 204 as inputs from a user or via some form of storage media. For example, the acoustic properties and characteristics (e.g., the acoustic reflection, absorption coefficients, interference properties, spatial dimensions and layouts, temperature settings, etc.) of acoustic environment 204 may be input or selected from a list of choices displayed by analysis system 230, rather than using excitation source 202 and capturing devices 206 to detect the characterization.

In this manner, characterization 214 may be generated analytically without the experimentation characterization described above (or the two methods may be combined to form characterization 214). In this manner, acoustic environment 204 need not actually exist or be physically accessible because an acoustic model of an actual venue may be made using actual measurements of the dimensions, layout and other acoustical properties, which may be obtained without physically accessing the acoustic environment 204. For example, the demolished Three Rivers Stadium that stood in Pittsburg, Pa. could be used as acoustic environment 204. A characterization of that environment may be generated by analysis system 230 based upon computer assisted drawings (CAD) or other information contained in the blue prints of the stadium (including, for example, the material composition of the seats in the stadium).

This application of the present invention could also be applied to create acoustic environments that never existed. In this manner, the acoustical characteristics of a virtual location having ideal acoustical properties, or a location that is impossible or difficult to actually measure may be represented by characterization 214. Examples of such fantastic, fictional, or imaginary acoustic environments that may be represented by characterization 214 are a jungle on prehistoric earth, a space habitat on Mars, a dormant volcano on Jupiter, a crater on the moon, and settings of books or movies such as the Lord of the Rings, as well as settings of video games and cartoons.

Figure 3:
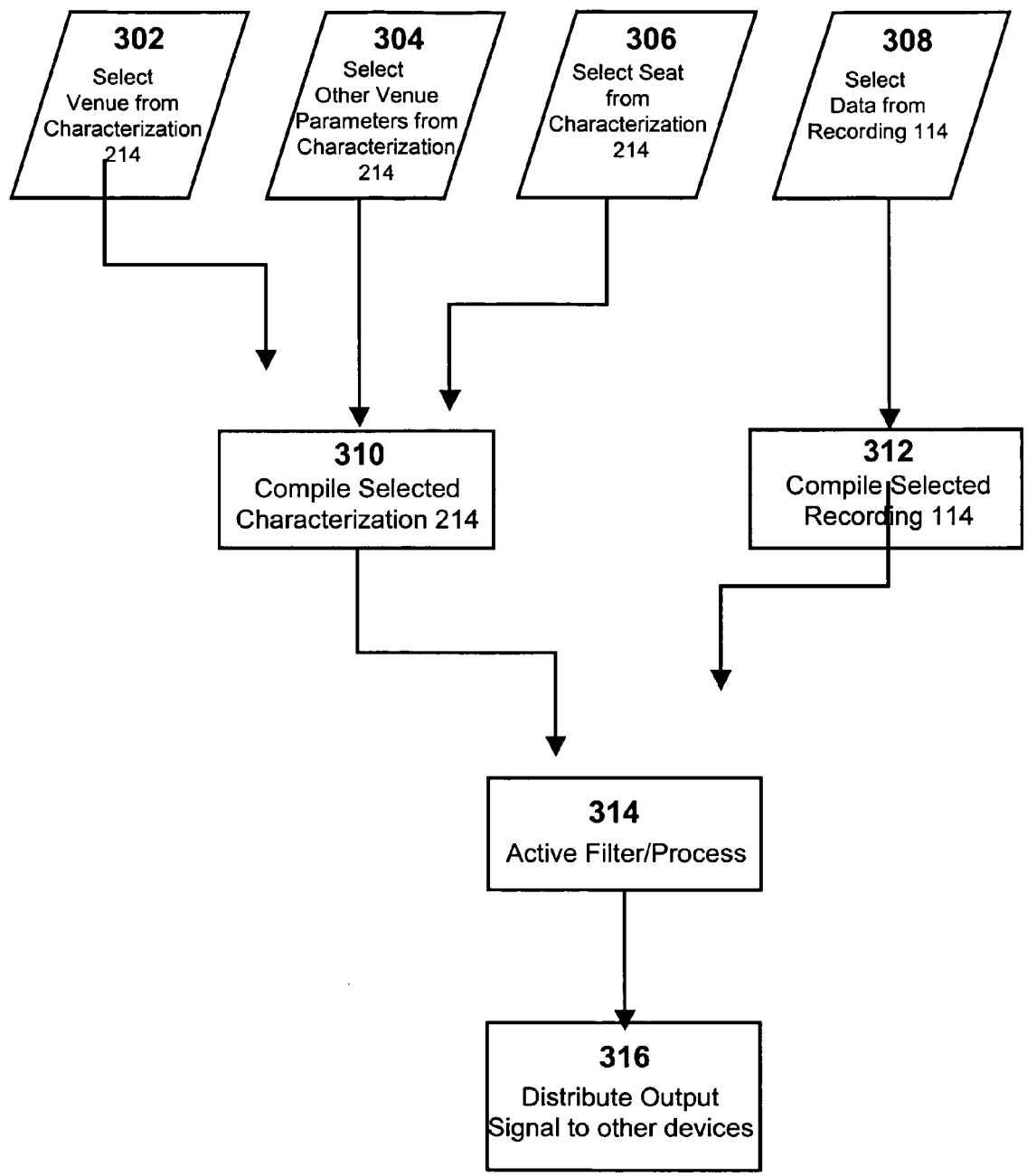
FIG. 3 is an illustration of one embodiment of a playback filtering process in accordance with the principles of the present invention.

FIG. 3 shows a block diagram of process 300 that may be used in accordance with the principles of the present invention to produce altered audio signals based on a selected environment. Process 300 may be used to alter recording 114 in accordance with a selected characterization 214. As a result of this process, recording 114 is reproduced and played back to sound as if the audio signals of audio source 102 stored on recording 114 were captured in and/or influenced by acoustic environment 204. Persons skilled in the art will appreciate that process 300 can alternately be used to remove the influences acoustic environment 104 may have on the signals recorded on recording 114 (so that recording 114 sounds "cleaner," as if it were made in a recording studio).

In steps 302, 304 and 306 the acoustic environment (e.g., a venue, stadium, etc.), location in the acoustic environment (e.g., a particular seat or section) and other venue parameters (e.g., height above the seat, temperature, amount of people in the venue, etc.) are selected by the user (if such options are available). In step 308, the audio data for processing (e.g., a song on a CD) is selected.

In steps 310 and 312, characterization 214 and recording 114 are utilized to condense the data selected in steps 302, 304, 306 and/or 308. Steps 310 and 312 would also include any preprocessing necessary so that the characterization and audio signals are compatible and ready for processing. For example, if the audio signals were recorded in analog form on magnetic tape, step 312 would include converting the analog signal to a digital signal (assuming the characterization is digital).

In step 314, the data from step 312 is filtered/processed with the data from step 314 to produce an altered audio signal. The altered audio signal is representative of what the original audio signal would have sounded like if it had been recorded and/or played back in the selected environment (if that option is selected). Alternatively, step 314 may also be used to remove the influences of acoustic environment 104 when one or more other steps (not shown for simplicity, but similar to steps 302, 304, 306 and 310) is included that provides a characterization of acoustic environment 104, so that the resultant signal is a "clean" version of audio signal 102.

In step 316, the resultant signal from recording 114 as filtered/processed with respect to characterization 214 is further processed (e.g., amplified, mixed, enhanced, etc.). The processed signal may be stored to a storage device, uploaded to the Internet, and/or played back to the user. This resultant signal may be provided to, for example, any system, apparatus and any other electrical or storage device.

Figure 4:
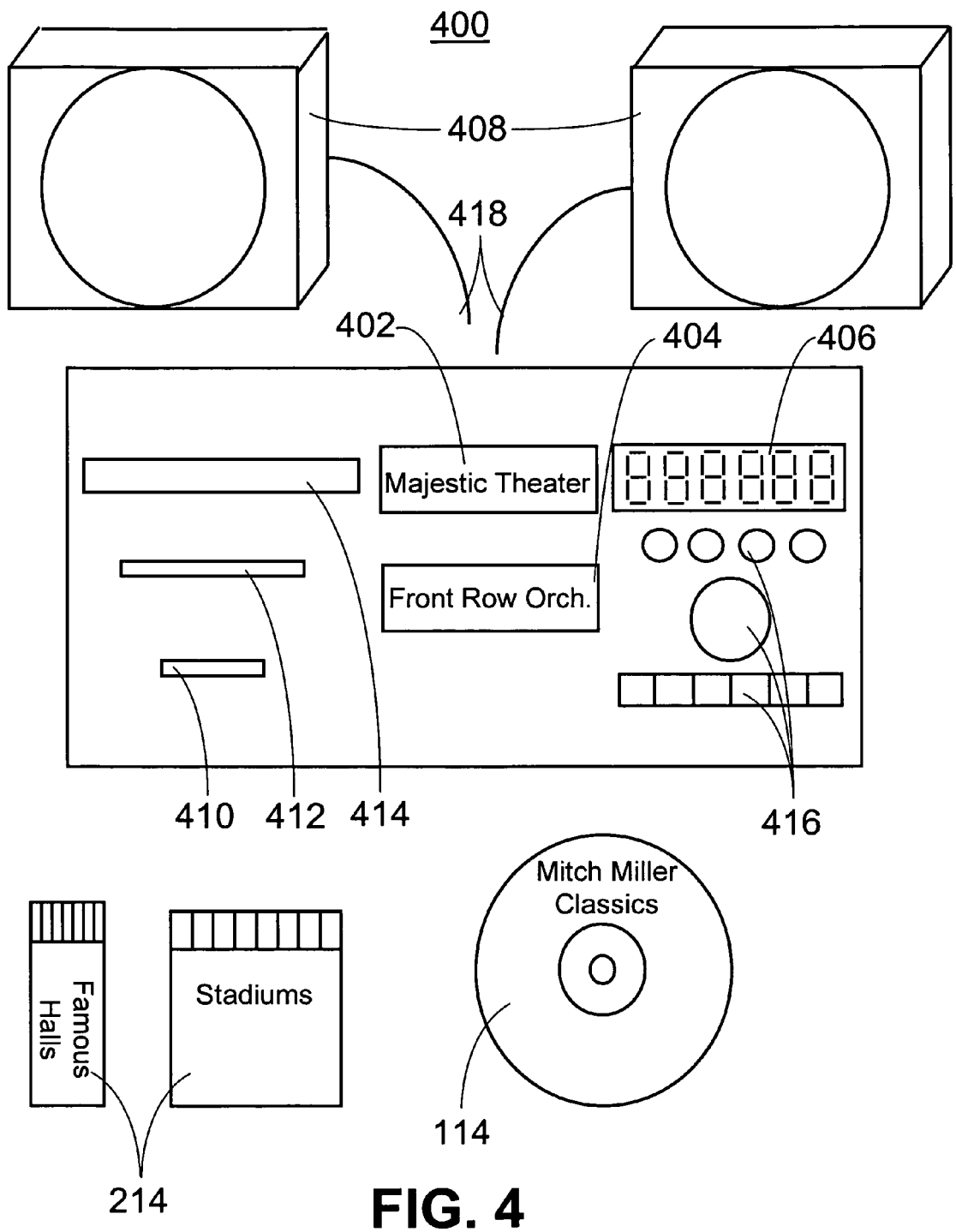
FIG. 4 is an illustration of one embodiment of a system for filtering the input signals and playing the output signals in accordance with the principles of the present invention.

FIG. 4 shows system 400 which is an example of a stereo component (e.g., a receiver, etc.) that incorporates circuitry that operates in accordance with the principles of the present invention. System 400 may be utilized to play back recording 114 as it would sound when influenced by the acoustic environment represented by characterization 214. System 400 may be operated and/or interfaced with other stereo components, systems and electronic device (e.g., as part of a home theater system, professional mixing system, sound controls of a venue, etc.), or its functionality may be built into other stereo, computer, or electrical components (e.g., a CD player, MP3 player, iPod, DVD player, car radio, speaker system, etc.) so that it is not a stand-alone component.

System 400 may include the ability to read one or more different forms of storage medium via media slots 412 and 414. Like the other systems of the present invention, system 400 may implement at least some of the steps of process 300 as described above. For example, a user may insert a CD into slot 414 which includes recording 114 (e.g., a CD of songs from The Phantom of the Opera as recorded in a recording studio). System 400 may then display selectable names or other identifying data of one or more selectable audio signals on any of its display screens. The user, for example, chooses recording 114. The user may also insert a memory card into slot 412 which includes characterization 214 (e.g., the Majestic Theater in New York City). System 400 may also display one or more selectable names or other identifying data of the characterizations stored on the memory card. The user, for example, chooses characterization 214.

When the user selects "PLAY," system 400 selects, for example, recording 114 and characterization 214. The particular recording and characterization that are selected may be based on user selections, system selections or a combination of user and system selections. System 400 then processes, for example, audio signal 114 and characterization 214 to produce an output signal. When the output signal is emitted, it sounds substantially similar to what would be heard in the acoustic environment represented by characterization 214 (e.g., the Majestic Theater) if recording 114 was played-back in the acoustic environment.

The memory card including the characterization of the Majestic Theater (discussed above) could also include a characterization of Three Rivers Stadium. Alternatively, the user may remove the memory card as discussed above and replace it with one having a characterization of Three Rivers Stadium. When "PLAY" is selected, system 400 selects the characterization of Three Rivers Stadium and the output signals produced by system 400 are substantially similar to the signals that would have been produced in a user-selectable seat of Three Rivers Stadium if The Phantom of the Opera was performed in Three Rivers Stadium. The user may also use system 400 to move their listening location to a different seat of Three Rivers Stadium (e.g., by navigating and selecting a different seat displayed on at least on of the display screens of system 400), to hear how The Phantom of the Opera would sound while sitting in the different seat.

As mentioned above and shown in FIG. 4, system 400 may include various displays to aide the user in the operation (e.g., the navigation and selection of an audio signal, characterization of an acoustic environment, location in an acoustic environment, etc.) of the system. For example, a venue display 402, location display 404 and recording display 406 are all options that can be included in system 400 (other options, such as changing the material of the recording environment, can also be provided to the user). Venue display 402 can display a selectable list of venues and/or the particular venue currently being utilized by system 400. Location display 404 can display a selectable list of seats and/or the particular seat or section currently being utilized by system 400. Recording display 406 may display, for example, the song or track on the CD currently being played and/or one or more selectable lists of tracks available to system 400. Alternatively, one skilled in the art will appreciate that the functionality of each display 402, display 404 and display 406 may be combined into a single display screen.

System 400 can be coupled to one or more devices (such as system 100, system 200, system 300, speakers 408, etc.). Each of these devices can receive signals via communication paths 418, as described above with respect to other communication paths.

For example, if system 400 is coupled to speakers 408, the user can listen to the altered audio signals. Speakers 408 may be a surround-sound system or other type of speaker system that may help emphasize the presence of the reproduced audio signals, or they may consist of something as simple as a pair of headphones. System 400 also provides the user with the ability to select the volume, characterization, audio input signals, etc. through controls 416.

Figure 5:
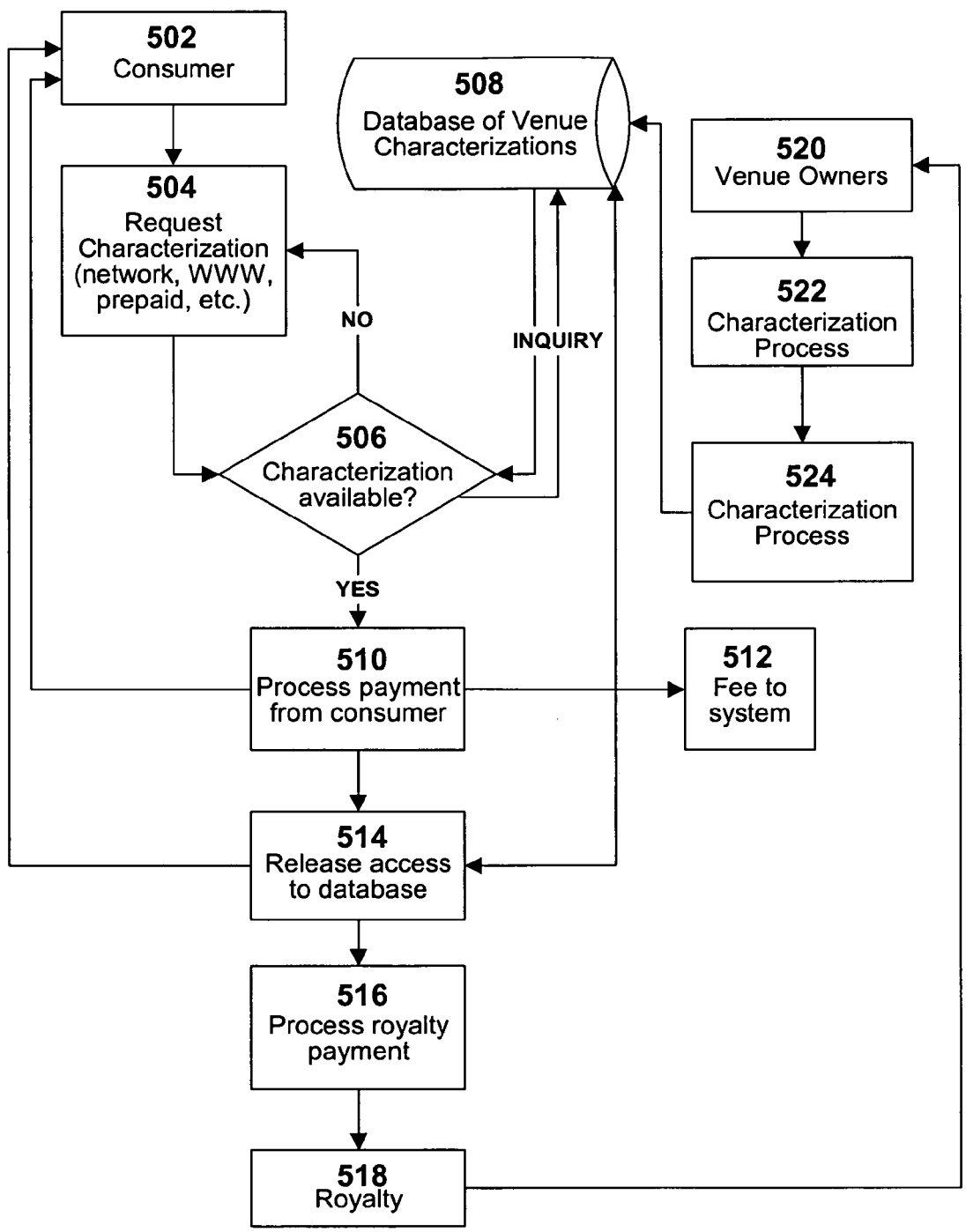
FIG. 5 is an illustration of a distribution and payment process for acoustic characterizations in accordance with the principles of the present invention.

FIG. 5 shows process 500 that may be utilized for the collection of royalty or other fees associated with the use of some embodiments of the present invention. For example, when a computer or computer controlled playback system is utilized, the environment provider (such as the Majestic Theater) or record label may sell/license a consumer access to an acoustic environment or recording. In this case, the provider could charge a one time fee for unlimited use or arrange any other desired payment system (e.g., charges for each individual access, charges for a monthly subscription, etc.). In this manner, owners of acoustic environment characterizations or audio recordings may be able to further commercialize their assets (e.g., their acoustic venue, sports stadium, local bar, song, comedy routine, concert, etc.). For simplicity, system 500 only shows acoustic environment characterizations being sold. Persons skilled in the art will appreciate that the same system can be used to sell/license audio signals or any other data a consumer may desire to use in accordance with the principles of the present invention.

In step 502, a consumer begins to use a data network that can access stored characterizations (e.g., such as the internet, prepaid system, etc.). The consumer requests a characterization of an acoustic environment in step 504, via the network, internet, world wide web, etc.

In steps 506 and 508, the system determines whether the requested characterization is available by inquiring with and/or searching through a database of acoustic environment characterizations. The user is notified that the requested characterization is not available by returning to step 504 (and providing the appropriate message). If the characterization requested by the user is available, the system proceeds to step 510 to charge, process and/or confirm authorization of the payment from the consumer for the requested characterization.

In step 512, the fee paid by the consumer is allocated to the system and, in step 514, the user is provided with access to the database of environment characterizations. The system also processes the royalty payment, if any, for the owner of the purchased characterization. If a royalty payment is due, it may be allocated to the environment owner in step 518.

The acoustic environment owner may collect the royalty payment(s) in step 520, as well as control access by process 500 to the selected characterizations. If additional characterizations are to be added to the system, those environments are characterized in step 522 (in accordance with the process described in connection with FIG. 2 above). Once processed, the new acoustic environment characterizations are sent to the database of acoustic environment characterizations in step 524.

Persons skilled in the art will appreciate that the detection systems described above in accordance with the principles of the present invention are provided as illustrations of the invention only, and that the invention is not limited by the specific configurations described above. For example, the embodiment shown in FIG. 4 may be combined with the embodiments shown in FIGS. 1 and 2. Combining these embodiments may be beneficial because, for example, system 400 may have access to the Internet and any songs and/or characterizations on the Internet (not shown).

Additionally, persons skilled in the art may consider combining the system of FIG. 4 with system of FIG. 2 in a manner that may allow system 400 to characterize the acoustic environment that speakers 408 are in. This characterization may be used as feedback, allowing system 400 to monitor the sound emitted and compensate for the acoustic environment speakers 408 are emitting the sound in. For example, the user's living room that The Phantom of the Opera is being played in may influence the sound after the recording was filtered by the Majestic Theater characterization. System 400 may characterize the room with equipment similar to system 200 and adjust the audio outputted from speakers 408 to compensate for any influence the acoustic environment of the room may have.

Moreover, it may also be understood by those skilled in the art that the various components of the detection systems according to the present invention may be manufactured together, or individually. They may be assembled as a single item or as multiple items to be linked together. However, as explained above, it is also contemplated that some or all of these components may utilize remote controls and/or displays, and that in certain embodiments, some components may be excluded (or combined with other components).

The invention is not limited in these manners. The above-described embodiments of the present invention are presented for purposes of illustration and not of limitation, and the present invention is limited only by the claims that follow.

What is claimed is:

1. A method for producing altered audio signals, said method comprising:
    displaying a plurality of audio signals available for selection;
    choosing one audio signal for processing based on a first selection by a user of said chosen audio signal from said plurality of audio signals;
    receiving a removable storage medium that is primarily used to store at least one acoustic environment characterization;
    displaying a plurality of acoustic environment characterizations available for selection, wherein said plurality of acoustic environment characterizations include said at least one acoustic environment characterization stored on said removable storage medium;
    selecting one characterization for processing said chosen audio signal based on a second selection by said user of said selected acoustic environment characterization from said plurality of acoustic environment characterizations; and
    processing said chosen audio signal and said selected characterization to produce an output signal representative of said chosen audio signal being played-back in an acoustic environment represented by said selected characterization.

2. The method of claim 1, wherein displaying a plurality of audio signals comprises displaying a list of names of said plurality audio signals.

3. The method of claim 1 further comprising receiving said chosen audio signal as streaming media.

4. The method of claim 1 further comprising receiving said chosen audio signal from the Internet.

5. The method of claim 1 further comprising receiving said chosen audio signal from a storage device.

6. The method of claim 1, wherein displaying said plurality of audio signals comprises displaying a list of names of said plurality of acoustic environment characterizations.

7. The method of claim 1, wherein said selected characterization is a characterization of an actual sports stadium.

8. The method of claim 1, wherein said selected characterization is a characterization of an actual concert hall.

9. The method of claim 1 further comprising generating said selected characterization.

10. The method of claim 1 further comprising receiving said selected characterization as streaming media.

11. The method of claim 1 further comprising receiving said selected characterization from the Internet.

12. The method of claim 1 further comprising receiving said selected characterization from a non-removable storage medium.

13. The method of claim 1 further comprising storing said selected characterization on a storage device.

14. The method of claim 1 further comprising storing said output signal on a storage device.

15. The method of claim 1, wherein displaying said plurality of audio signals occurs on a first display screen and said displaying plurality of acoustic environment characterizations occurs on said first display screen.

16. The method of claim 1 further comprising:
    displaying a plurality of locations in the acoustic environment represented by said selected characterization that may be chosen;
    choosing one location for processing said chosen audio signal based on a third selection by said user of one location from said plurality of locations; and
    processing said chosen audio signal based on said chosen location to produce an output signal representative of said chosen audio signal being played-back in an acoustic environment where said user would be in said chosen location.

17. The method of claim 16, wherein:
    said displaying said plurality of audio signals occurs on a first display screen;
    said displaying said plurality of acoustic environment characterizations occurs on said first display screen; and
    said displaying said plurality of locations occurs on said first display screen.

18. The method of claim 16, wherein:
    displaying said plurality of audio signals occurs on a first display screen;
    displaying said plurality of acoustic characterizations occurs on a second display screen; and
    display said plurality of locations occurs on a third display screen.

19. A method for producing altered audio signals, said method comprising:
    displaying a plurality of audio signals available for selection on a first display screen;
    choosing one audio signal for processing based on a first selection by a user of said chosen audio signal from said plurality of audio signals;
    receiving a removable storage medium that is primarily used to store at least one acoustic environment characterization;
    displaying a plurality of acoustic environment characterizations available for selection on a second display screen, wherein said plurality of acoustic environment characterizations include said at least one acoustic environment characterization stored on said removable storage medium;
    selecting one characterization for processing said chosen audio signal based on a second selection by said user of said selected acoustic environment characterization from said plurality of acoustic environment characterizations; and processing said chosen audio signal and said selected characterization to produce an output signal representative of said chosen audio signal being played-back in an acoustic environment represented by said selected characterization.

20. A method for producing altered audio signals, said method comprising:
    displaying a plurality of audio signals available for selection on a display screen;
    choosing one audio signal for processing based on a first selection by a user of said chosen audio signal from said plurality of audio signals;
    receiving a removable storage medium that is primarily used to store at least one acoustic environment characterization;
    displaying a plurality of acoustic environment characterizations available for selection on said display screen, wherein said plurality of acoustic environment characterizations include said at least one acoustic environment characterization stored on said removable storage medium;
    selecting one characterization for processing said chosen audio signal based on a second selection by said user of said selected acoustic environment characterization from said plurality of acoustic environment characterizations; and
    processing said chosen audio signal and said selected characterization to produce an output signal representative of said chosen audio signal being played-back in an acoustic environment represented by said selected characterization.

21. An apparatus for playing back altered audio signals, said apparatus comprising:
    at least one display screen;
    a media slot that receives a removable storage medium that is primarily used to store at least one acoustic environment characterization; and
    circuitry configured to:
        display on said at least one display screen a plurality of audio signals;
        choose one audio signal to process based on a first selection by a user of one audio signal from said plurality of audio signals;
        display on said at least one display screen a plurality of acoustic environment characterizations, wherein said plurality of acoustic environment characterizations includes said at least one acoustic environment characterization stored on said removable storage medium;
        select one characterization to process said chosen audio signal based on a second selection by said user of one acoustic environment characterization from said plurality of characterizations; and
        process said chosen audio signal and said selected characterization into an output signal representative of said audio signal being played-back in an acoustic environment represented by said selected characterization.

22. The apparatus of claim 21, wherein said circuitry is further configured to display on said at least one display screen a list of names representing said plurality of audio signals.

23. The apparatus of claim 21 further comprising an input device coupled to said circuitry.

24. The apparatus of claim 23, wherein said input device provides data as streaming media to said circuitry.

25. The apparatus of claim 23, wherein said input device provides data from the Internet to said circuitry.

26. The apparatus of claim 23, wherein said input device is a non-removable storage device.

27. The apparatus of claim 21, wherein said circuitry is further configured to display on said at least one display screen a list of names representing said plurality of acoustic environment characterizations.

28. The apparatus of claim 21, wherein said selected characterization is a characterization of an actual sports stadium.

29. The apparatus of claim 21, wherein said selected characterization is a characterization of an actual concert hall.

30. The apparatus of claim 21, wherein said circuitry is further configured to generate said selected characterization.

31. The apparatus of claim 21 further comprising an output device that receives said processed output signal from said circuitry.

32. The apparatus of claim 31, wherein said output device is a storage device.

33. The apparatus of claim 21, wherein:
    said at least one display screen is a single display screen; and
    said circuitry is further configured to display said plurality of audio signals and said plurality of acoustic environment characterizations on said single display screen.

34. The apparatus of claim 21, wherein said circuitry is further configured to:
    display on said at least one display screen a plurality of locations in said acoustic environment that are available for selection;
    choose one location for processing said chosen audio signal based on a third selection by said user of a first location from said plurality of locations; and
    process said chosen audio signal and said chosen location to produce an output signal representative of said chosen audio signal being played-back in an acoustic environment represented by said chosen location.

35. The apparatus of claim 34, wherein:
    said at least one display screen is a single display screen; and
    said circuitry is further configured to display said plurality of audio signals, said plurality of acoustic environment characterizations and said plurality of locations on said single display screen.

36. The apparatus of claim 34, wherein:
    said at least one display screen is at least three display screens; and
    said circuitry is configured to:
        display said plurality of audio signals on a first display screen;
        display said plurality of acoustic characterizations on a second display screen; and
        display said plurality of locations on a third display screen.

37. An apparatus for playing back altered audio signals, said apparatus comprising:
    at least two display screens;
    a media slot that receives a removable storage medium that is primarily used to store at least one acoustic environment characterization; and
    circuitry configured to:
        display on a first display screen a plurality of audio signals;

choose one audio signal to process based on a first selection by a user of one audio signal from said plurality of audio signals;

display on a second display screen a plurality of acoustic environment characterizations, wherein said plurality of acoustic environment characterizations includes said at least one acoustic environment characterization stored on said removable storage medium;

select one characterization to process said chosen audio signal based on a second selection by said user of one acoustic environment characterization from said plurality of characterizations; and process said chosen audio signal and said selected characterization into an output signal representative of said audio signal being played-back in an acoustic environment represented by said selected characterization.

38. An apparatus for playing back altered audio signals, said apparatus comprising:

a display screen;

a media slot that receives a removable storage medium that is primarily used to store at least one acoustic environment characterization; and circuitry configured to:

display on said display screen a plurality of audio signals;

choose one audio signal to process based on a first selection by a user of one audio signal from said plurality of audio signals;

display on said display screen a plurality of acoustic environment characterizations, wherein said plurality of acoustic environment characterizations includes said at least one acoustic environment characterization stored on said removable storage medium;

select one characterization to process said chosen audio signal based on a second selection by said user of one acoustic environment characterization from said plurality of characterizations; and process said chosen audio signal and said selected characterization into an output signal representative of said audio signal being played-back in an acoustic environment represented by said selected characterization.

* * * * *